(12) United States Patent
Thompson et al.

(10) Patent No.: US 7,064,772 B1
(45) Date of Patent: Jun. 20, 2006

(54) RESIZABLE GRAPHICAL USER INTERFACE

(75) Inventors: Mark R. Thompson, Phoenix, AZ (US); Nathan F. Raciborski, Jackson, WY (US)

(73) Assignee: Aerocast.com, Inc., San Diego, CA (US)

( * ) Notice: Subject to any disclaimer, the term of this patent is extended or adjusted under 35 U.S.C. 154(b) by 0 days.

(21) Appl. No.: 09/663,551

(22) Filed: Sep. 18, 2000

Related U.S. Application Data

(60) Provisional application No. 60/209,007, filed on Jun. 1, 2000.

(51) Int. Cl.
*G06F 9/00* (2006.01)

(52) U.S. Cl. ............... 345/661; 715/700; 715/763

(58) Field of Classification Search ........ 345/661–663, 345/676–678, 700, 716, 762, 764, 765, 744, 345/866, 810, 815, 841, 786, 798, 790, 792, 345/672, 781, 768, 763; 709/328; 715/700–702, 715/721, 735, 763–765
See application file for complete search history.

(56) References Cited

U.S. PATENT DOCUMENTS

| | | | | |
|---|---|---|---|---|
| 5,384,910 A | * | 1/1995 | Torres .................... | 345/866 |
| 5,631,974 A | * | 5/1997 | Lau-Kee et al. ........... | 382/132 |
| 5,751,283 A | | 5/1998 | Smith | |
| 5,754,179 A | * | 5/1998 | Hocker et al. ............. | 345/348 |
| 5,771,032 A | * | 6/1998 | Cline et al. ............... | 345/786 |
| 5,784,045 A | * | 7/1998 | Cline et al. ............... | 345/672 |
| 5,796,402 A | * | 8/1998 | Ellison-Taylor ........... | 345/790 |
| 5,838,318 A | * | 11/1998 | Porter et al. ............... | 345/792 |
| 5,862,372 A | * | 1/1999 | Morris et al. .............. | 717/109 |
| 5,886,694 A | | 3/1999 | Breinberg et al. | |
| 5,977,968 A | * | 11/1999 | LeBlanc .................... | 345/339 |
| 6,020,887 A | * | 2/2000 | Loring et al. .............. | 345/781 |
| 6,055,570 A | | 4/2000 | Nielsen | |
| 6,141,737 A | * | 10/2000 | Krantz et al. .............. | 711/171 |
| 6,208,336 B1 | * | 3/2001 | Carter ....................... | 345/333 |
| 6,335,743 B1 | | 1/2002 | Owings | |
| 6,396,520 B1 | * | 5/2002 | Ording ...................... | 345/798 |
| 2001/0035879 A1 | * | 11/2001 | Washington et al. ...... | 345/763 |

FOREIGN PATENT DOCUMENTS

| | | |
|---|---|---|
| EP | 0 622 744 A1 | 2/1994 |
| EP | 0717345 * | 6/1996 |

OTHER PUBLICATIONS

U.S. Appl No. 90/518492, filed Mar. 3, 2000, Kudukoli, R. et al.

U.S. Appl No. 09/595003, filed May 13, 2005, Vazquez, N. et al.

\* cited by examiner

*Primary Examiner*—Matthew C. Bella
*Assistant Examiner*—Wesner Sajous
(74) *Attorney, Agent, or Firm*—Townsend and Townsend and Crew LLP

(57) ABSTRACT

A system for providing reconfigurable graphical user interfaces. An original GUI, such as one might use to control an audio or video player application program, is modified by a designer such that the end-user of the GUI can alter individual subsections of the GUI or alternatively designate such sections as non-reconfigurable. The designer thus controls the properties of the GUI, while allowing the end-user to individual aspects of the GUI.

19 Claims, 7 Drawing Sheets

RESIZABLE GRAPHICAL USER INTERFACE

This application claims the benefit of U.S. provisional Application No. 60/209,007, entitled "A Streaming Media Network With Improved Quality of Service", filed on Jun. 1, 2000.

This invention relates generally to graphical user interfaces. More particularly, this invention relates to resizing of elements within a graphical user interface.

BACKGROUND OF THE INVENTION

In the past, graphical user interfaces (GUI's) have been supplied as part of computer programs to facilitate the interaction between the user of a program and the program itself. For example, a typical audio player GUI allows a user to interface with the application program. The audio program provides a basic GUI that the user can use as a dialog box to direct the program on how to perform its functions, e.g., play, fast forward, change tracks, etc. A dialog is essentially an interface that allows the user to communicate with the program, e.g. the common dialog boxes of Microsoft Windows 98™.

Furthermore, additional graphical user interfaces, commonly referred to as skins are available to "cover" the basic graphical user interface supplied by the program. These "skins" serve as a GUI that replaces the basic graphical user interface supplied with the program. These skins can be supplied as optional GUI's with the program itself or by third parties. The skin provides the user with options other than the standard graphical user interface supplied with the program. Thus, the user can choose a skin that appeals to that user's personal preferences.

Such GUI's have in the past been expandable such that all of the features expand or compress, e.g., as is commonly done by pulling on the corner of a dialog box. Such expansion or compression results in a proportional change in the spatial relationships of the entire box, for example, through stretching, expansion or compression of the entire box. Thus, depending on how the GUI is stretched, expanded or compressed, various components of the skin can become distorted. Consequently, if the skin contains a logo, a trademark, copyrightable subject matter, artwork, etc. the act of expanding the entire skin can result in a distortion of content of the skin. Such distortion is undesirable when the creator of the skin desires to maintain certain aspects of the appearance of the GUI regardless of how the remainder of the GUI is altered.

SUMMARY OF THE INVENTION

One embodiment of the invention provides a system for providing an initial configuration of the GUI for use by a user; and, configuring a subsection of the GUI so as to allow the user to reconfigure the shape of a subsection during use by the user.

Another embodiment of the invention provides a system for providing a graphical user interface; defining a subsection of the graphical user interface; and designating the subsection of the graphical user interface as reconfigurable, so that during use the user can reconfigure the subsection without reconfiguring the entire graphical user interface.

Yet another embodiment of the invention provides a system for providing a graphical user interface; defining a subsection of the graphical user interface; and designating the subsection of the graphical user interface as non-reconfigurable, so that during use the user can reconfigure the remainder of the graphical user interface without reconfiguring the designated subsection of the graphical user interface.

Further features of the invention will be apparent to those of ordinary skill in the art from a consideration of the folowing description taken in conjunction with the accompanying drawings, wherein certain methods, apparatuses and articles of manufacture for practicing the embodiments of the invention are illustrated. However, it is to be understood that the invention is not limited to the details disclosed but includes all such variations and modifications as fall within the spirit of the invention and the scope of the issued appended claims.

DESCRIPTION OF THE SPECIFIC EMBODIMENTS

Figure 1:
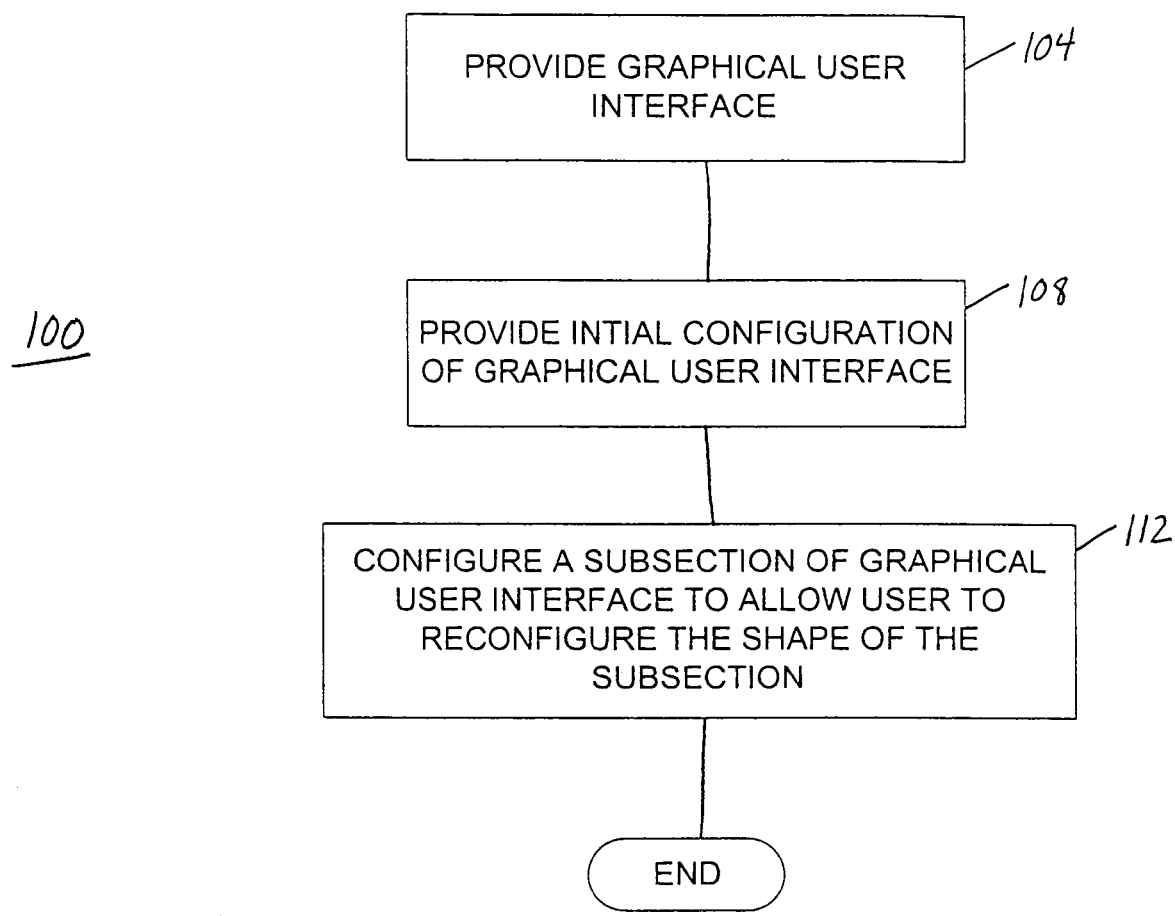
FIG. 1 illustrates a flowchart for an embodiment of the invention in which a subsection of a graphical user interface is reconfigured by a user.

Referring now to the figures and more particularly to FIG. 1, a first embodiment of the invention can be seen. Namely, FIG. 1 illustrates a flow chart 100 for implementing this embodiment of the invention. In FIG. 1, a graphical user interface (GUI) is provided in block 104. Such a GUI could take the form of an audio player which allows the control of an audio datastream, such as one might currently use in the RealPlayer™ by RealNetworks, Inc. As another example, the GUI could take the form of a video player that controls the display of a video data stream. Similarly, other applications of such a GUI could be applied as well.

Figure 7:
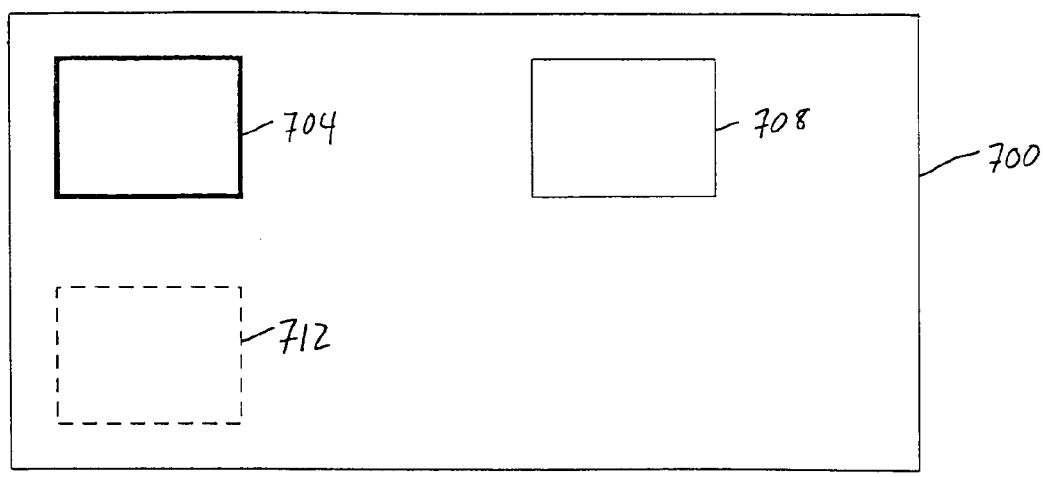
FIG. 7 illustrates a graphical user interface comprised of three subsections which can be designated as reconfigurable or non-reconfigurable.

In block 108, an initial configuration of the GUI is provided. An exemplary block diagram of such a GUI is shown in FIG. 7 as element 700. As can be seen in FIG. 7, the GUI 700 can be comprised of a plurality of subelements or subsections. Thus, the GUI is shown in FIG. 7 comprised of subsections 704, 708, and 712. For example, such subsections could be artwork, logos, text blocks, trademarks or service marks, copyrightable material. They might take the form, for example, of buttons, arrows, company names, screens for showing streaming video or stored video. Thus, a variety of subelements can exist within the graphical user interface.

In block 112, this embodiment of the invention allows a user, such as the designer of the GUI, to configure a subsection of the GUI such that the end-user (for example the person who will interface with the GUI) can reconfigure the shape of the subsection during use. Thus, an end-user would be able to change the shape of a component of the GUI while not changing other components of the GUI. Current systems enlarge all components of a GUI equally, without allowing the end-user to reconfigure individual components of the GUI independently of the remainder of the GUI. Consequently, this embodiment of the invention facilitates the design of the GUI for the designer and the manipulation of the GUI by the end-user.

Figure 2:
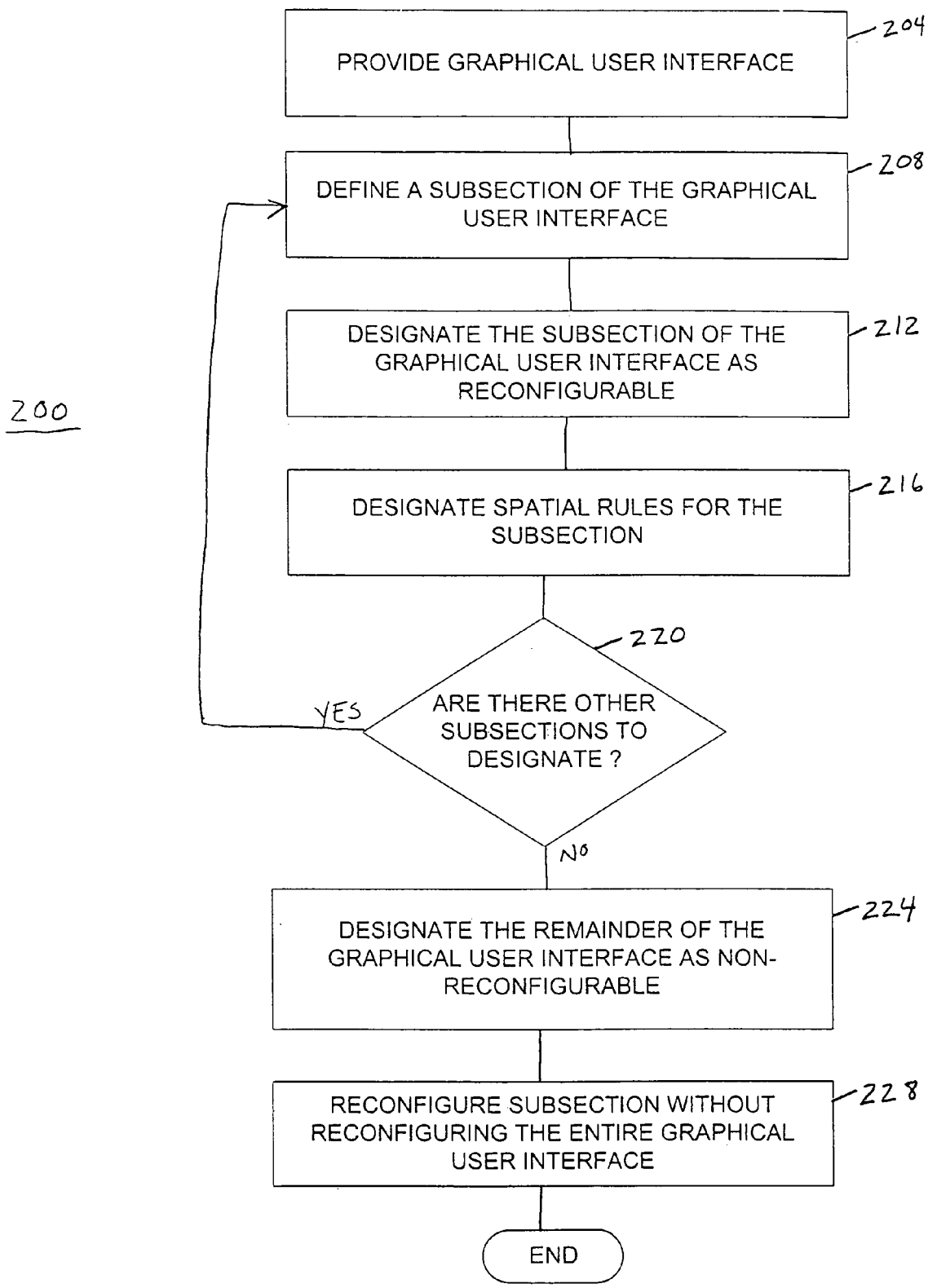
FIG. 2 illustrates a flowchart for an embodiment of the invention in which a subsection of a graphical user interface is designated as reconfigurable while the remainder of the graphical user interface is not designated as reconfigurable.

FIG. 2 illustrates a flow chart 200 for implementing another embodiment of the invention. In this method, a graphical user interface is provided in block 204. A subsection of the graphical user interface is defined in block 208. For example, text that a designer does not want distorted can be designated as the subsection. Thus, rules of reconfiguring the text can be set for that specific subsection of text. This allows the designer to control distortion of such text and protect its look and feel to a user.

In block 212, a designer of a GUI (e.g., a skin), designates a subsection of the original GUI. Then, spatial rules can be designated for that particular subsection as shown in block 216. Then, as shown in block 220, a determination is made as to whether the designer desires to set rules for other subsections of the GUI. If other subsections do exist, then the flow chart repeats blocks 208, 212, and 216. Upon completion of setting rules for all desired subsections, the remainder of the GUI can be designated as non-reconfigurable, as shown in block 224. Thus, the modified GUI can be supplied through a variety of ways for use by the end-user. At that stage, the end-user can reconfigure a subsection without reconfiguring the entire GUI, as shown in block 228. For example, if a designer specified a row of buttons as reconfigurable, but not the company logo that appeared as part of a skin, the user would be able to reconfigure the row of buttons while not being able to reconfigure or distort the company logo. Such a system allows the designer to control the overall look and feel of a GUI, while still providing an end-user with the ability to modify a GUI (e.g., a skin) to some degree.

Typically, a GUI is stored as a text file that a designer accesses through a program, such as the commercially available program PHOTOSHOP™ by Adobe Systems, Inc. With such a program, the designer of the modified GUI or skin can designate subsections and define properties for those subsections. Then, when the modified GUI is loaded to serve as the GUI interface for a program, the defined properties will control how that modified GUI or skin can be reconfigured. Thus, this is a straightforward manner in which spatial rules can be determined for a subsection.

Figure 3:
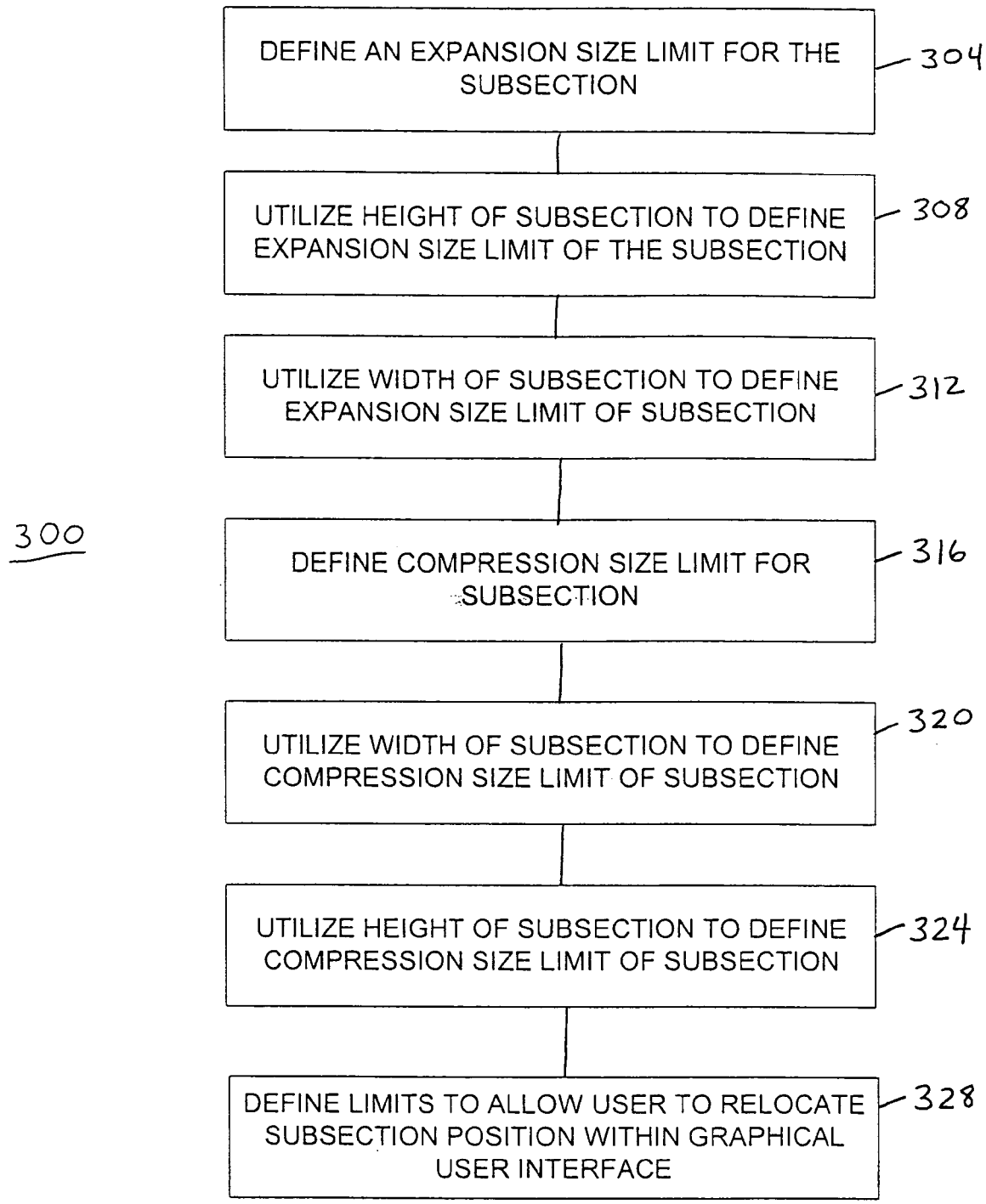
FIG. 3 illustrates a flowchart for an example of an embodiment of the invention in which limits of reconfiguration are defined for a subsection of a graphical user interface.

Yet another embodiment of the invention can be seen in flow chart 300 of FIG. 3. FIG. 3 illustrates an example of how the spatial rules can be set for a particular subsection of a GUI. In block 304 of FIG. 3, an expansion size limit is set for the designated subsection of the GUI. In such a case, a designer may determine that some expansion of a subsection is acceptable; however, at the same time, the designer may determine that the expansion must be limited at some point. Thus, even if the end-user continues to expand the remainder of the GUI, the expansion limit will prevent the subsection with an expansion limit from being expanded. Blocks 308 and 312 illustrates examples of how such limits could be implemented. For example, one could utilize the height of the subsection to define the expansion size limit. Similarly, as shown by block 312, the designer could designate the width of the subsection to define the expansion size limit of the subsection.

Similarly, the designer could set compression limits for a subsection of a GUI, as shown by block 316. Again, blocks 320 and 324 illustrate that such compression limits may be defined by the width of the subsection as shown in block 320 or the height of the subsection as shown by block 324.

Expansion and compression are but two examples of spatial limits that could be imposed on a subsection. In addition, other limitations, such as limitations on stretching a subsection could be imposed, for example. Also, as shown by block 328, limitations on how a subsection is relocated within a GUI relative to a reference point could be implemented. Thus, a subsection that originally resided in one corner of a GUI, for example, could be designated as movable to any of the other corners of the GUI, but not the middle. This allows the end-user of a GUI (e.g., a skin) to relocate elements within a GUI, but also allows the designer of the GUI to control where the subsections can be relocated to. In this manner, limits can be defined to allow the end-user to relocate the subsection position within the graphical user interface.

Other properties of a subsection can be defined as well. For example, some graphic figures do not lend themselves well to stretching. A lattice is one such example. When a lattice is stretched the appearance of the lattice is distorted. Thus, one property that could be set for a subsection is that the lattice material would duplicate or repeat as the subsection was expanded. Mirroring is another property. A subsection could be designated to create a mirror image if it is expanded in one direction as opposed to a different reference direction.

Figure 4:
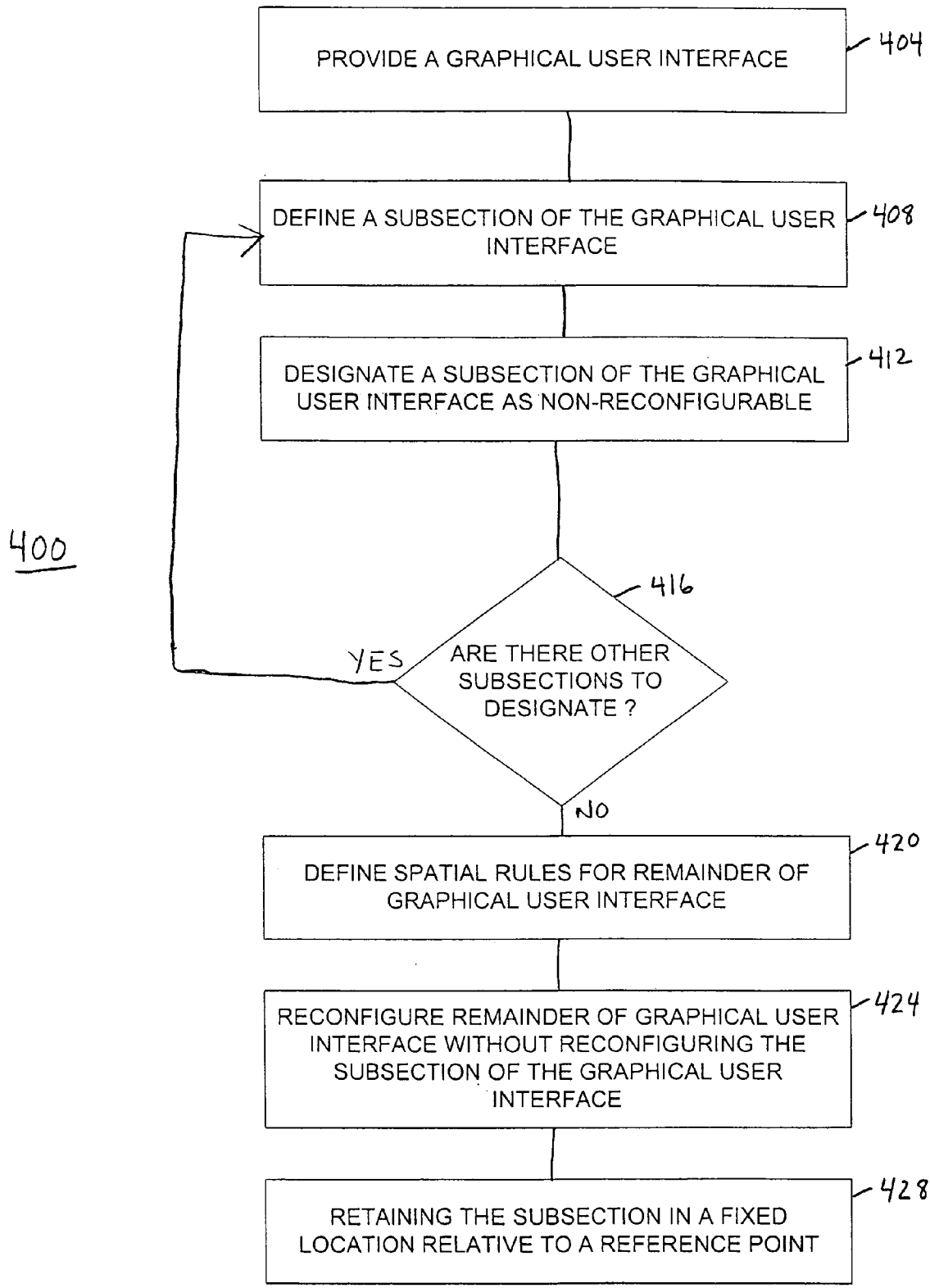
FIG. 4 illustrates a flowchart for an embodiment of the invention in which a subsection of a graphical user interface is designated as non-reconfigurable.

FIG. 4 illustrates yet another embodiment of the invention via flow chart 400. In block 404 of FIG. 4, a GUI is provided. In block 408, a subsection of the GUI is defined. The subsection is designated by the designer of the modified GUI as non-reconfigurable in block 412. Thus, while the remainder of the GUI may be expanded, compressed, stretched, etc. the designated subsection retains its shape. A determination is made in block 416 as to whether other subsections of the GUI should have rules set for them. If so, blocks 408 and 412 can be repeated for the additional subsections. Once completed, spatial rules can be set for the remainder of the GUI, as shown in block 420. Thus, this illustrates that while one subsection of a GUI may be designated as non-reconfigurable, a different subsection can be designated as reconfigurable, or reconfigurable within predefined limits. Consequently, the designer of the modified GUI has a tool for maintaining the appearance of some aspects of the GUI while allowing the user to freely modify other facets.

In block 424, an end-user is permitted to reconfigure the remainder of the GUI that has not been designated as non-reconfigurable, while not reconfiguring the subsection of the GUI that was designated as non-reconfigurable. Thus, if an end-user clicks on a corner of a dialog box GUI and drags the corner so as to expand the GUI, the reconfigurable portions of the GUI will expand, while the non-reconfigurable portions will retain their original shape as designated by the designer. Again, the designer is able to maintain certain features of the appearance of the GUI while allowing the end-user to modify the GUI. Similarly, as noted by block 428, the subsection could be fixed in a location relative to a reference point. For example, consider that a GUI is stretched. A designer can designate that the logo subsection, for example, always maintain its position within 1/8 inch of the top of the GUI. Thus, regardless of how the end-user modifies other elements of the GUI, the designer is able to control the location of elements, such as a logo.

Figure 5:
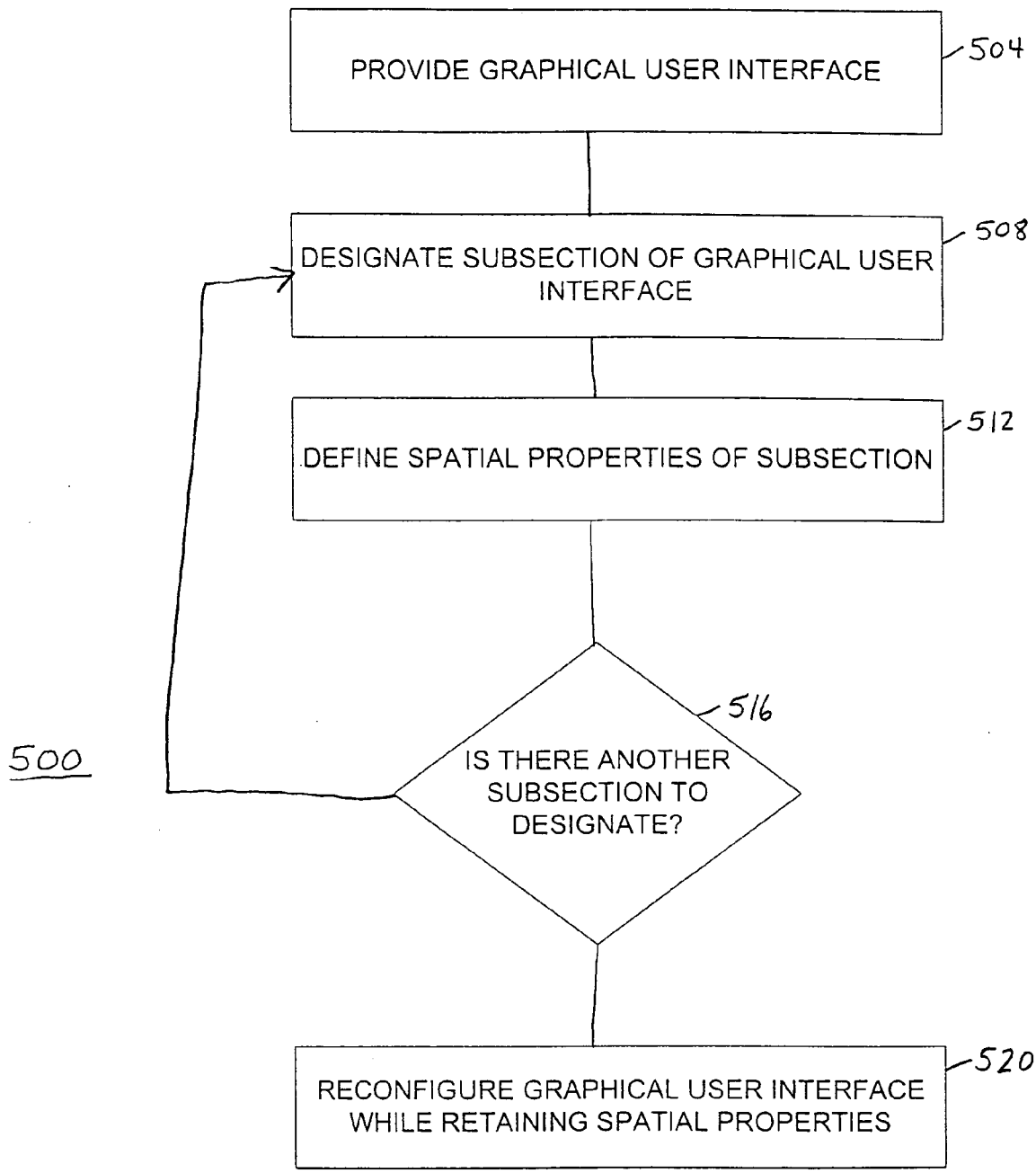
FIG. 5 illustrates a flowchart for an embodiment of the invention in which spatial properties are defined for a subsection of a graphical user interface.

FIG. 5 illustrates yet another embodiment of the invention. In block 504 of FIG. 5, a GUI is provided. Again, a subsection of the GUI is designated, for example through the PHOTOSHOP software and a mouse interface device, as shown in block 508. In block 512, spatial properties of the subsection are defined. In block 516, a determination is made as to whether there are other subsections to designate. If so, those subsections are designated. If not, the GUI can be reconfigured by an end-user (e.g., someone using a video player application program) while retaining the spatial properties defined earlier.

Figure 6:
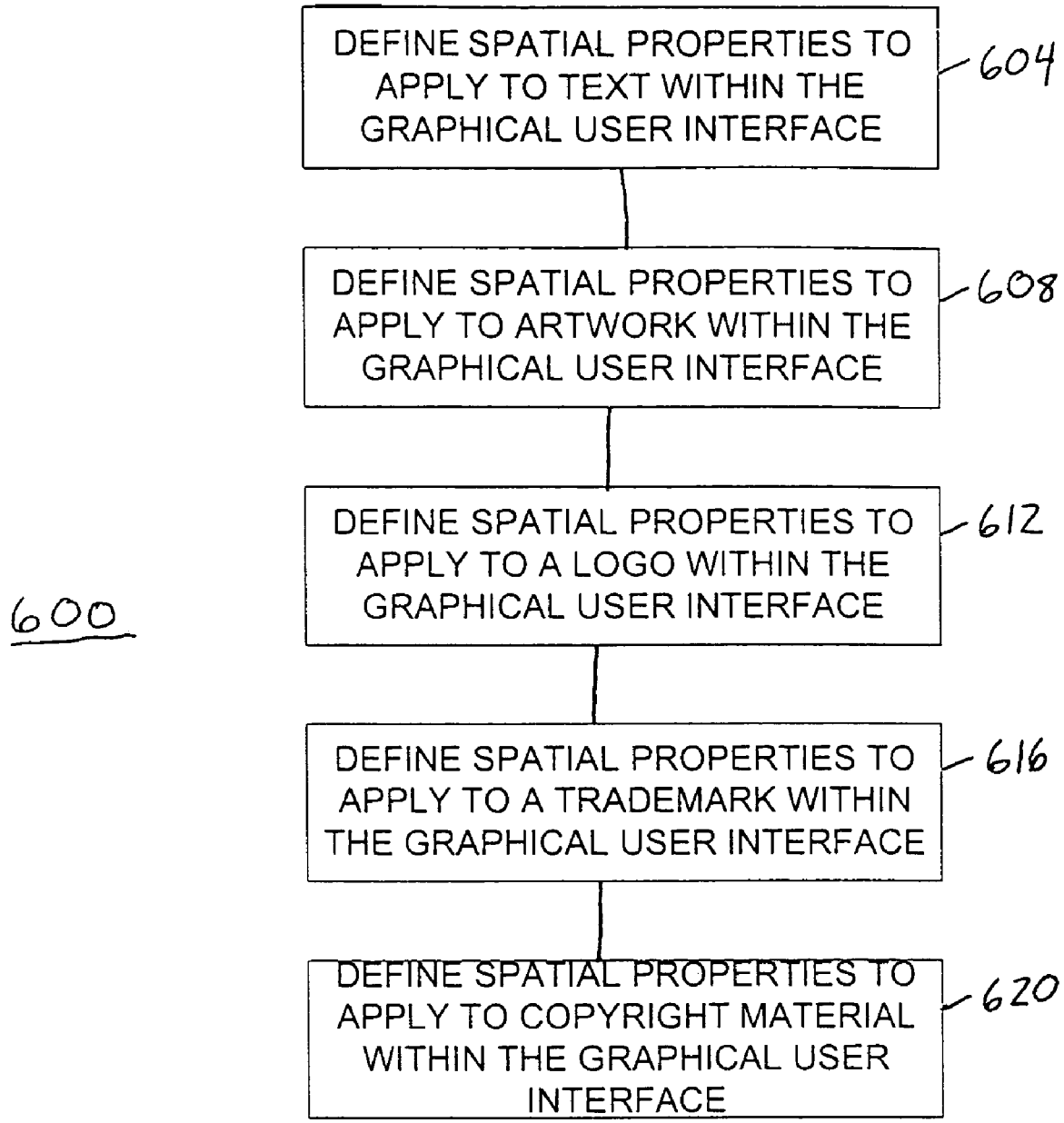
FIG. 6 illustrates a flowchart for an embodiment of the invention in which spatial properties are defined for various aspects of a graphical user interface.

FIG. 6 illustrates examples of how the spatial properties of a subsection can be defined. For example, in block 604, spatial properties of a textual subsection are defined. Thus, the maximum and minimum size of the text could be set. Similarly, the relocation limits of the text could be set as a spatial property. In such a case, the limits on where a subsection of text is relocated to within a GUI are defined. Similarly, block 608 shows that spatial properties of an artwork subsection could be defined, for example, a company logo or trademark as shown in blocks 612 and 616.

Figure 8:
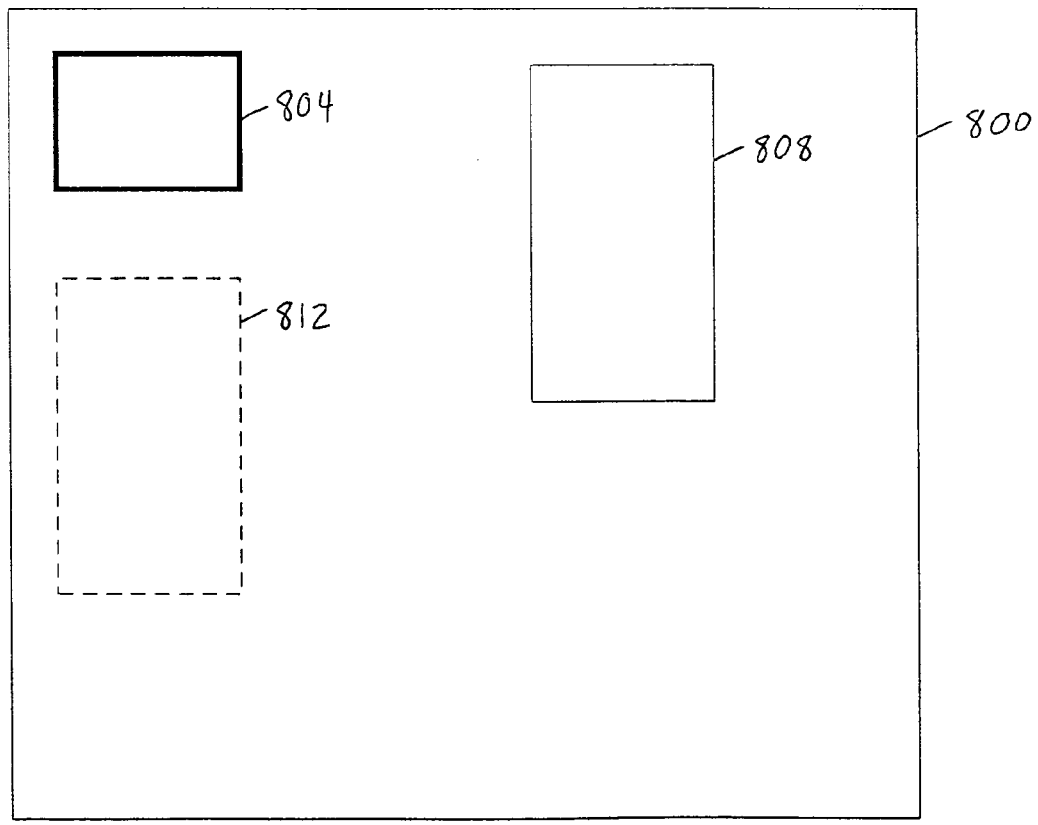
FIG. 8 illustrates an example of the effect of designating the subsections in FIG. 7 as reconfigurable or non-reconfigurable after expansion of the graphical user interface.

FIGS. 7 and 8 illustrate an example of how the embodiments of the invention can be implemented. FIG. 7 illustrates a GUI 700 which has at least three subsections 704, 708, and 712. Each of these subsections can be designated by a designer of the GUI as either a reconfigurable block with property limits or as a non-reconfigurable block. For purposes of this example, block 704 has been designated as a non-reconfigurable block with a static location relative to the upper lefthand corner of the GUI 700 outline. Such a block might be designated for a logo that goes on the GUI, such that the logo is not distorted regardless of how the end-user stretches the GUI 700. In contrast blocks, 708 and 712 are designated as subsections that can expand to predefined limits. Thus, as GUI 700 is expanded so as to become GUI 800, subsections 708 and 712 expand to become subsections 808 and 812. FIGS. 7 and 8 also illustrate how block 712 is designated to maintain a spatial distance from block 704 such that the same spatial distance is maintained in FIG. 8 as shown by the distance between subsections 804 and 812.

One embodiment of the invention allows a designer to control the look and feel of a GUI, as illustrated in block 620. Thus, the designer can control the look and feel of any reconfigured GUI while allowing the end-user to freely alter other aspects of the GUI that do not alter the look and feel.

While various embodiments of the invention have been described as methods or apparatus for implementing the invention. It should be understood that the invention can be implemented through code coupled to a computer, e.g., code resident on a computer or accessible by the computer. For example, software and databases could be utilized to implement many of the methods discussed above. Thus, in addition to embodiments where the invention is accomplished by hardware, it is also noted that these embodiments can be accomplished through the use of an article of manufacture comprised of a computer usable medium having a computer readable program code embodied therein, which causes the enablement of the functions disclosed in this description. Therefore, it is desired that the embodiments expressed above also be considered protected by this patent in their program code means as well.

It is also envisioned that embodiments of the invention could be accomplished as computer signals embodied in a carrier wave, as well as electrical signals propagated through a transmission medium. Thus, the various information discussed above could be formatted in a structure, such as a data structure, and transmitted as an electrical signal through a transmission medium.

It is also noted that many of the structures and acts recited herein can be recited as means for performing a function or steps for performing a function, respectively. Therefore, it should be understood that such language is entitled to cover all such structures or acts disclosed within this specification and their equivalents, including the matter incorporated by reference.

It is thought that the apparatuses and methods of the embodiments of the present invention and many of its attendant advantages will be understood from this specification and it will be apparent that various changes may be made in the form, construction and arrangement of the parts thereof without departing from the spirit and scope of the invention or sacrificing all of its material advantages, the form herein before described being merely exemplary embodiments thereof.

What is claimed is:

1. A method of providing a graphical user interface for control of a program, said method comprising:
   providing an initial configuration of said graphical user interface for use by a user to control an application program;
   configuring a subsection of said graphical user interface so as to allow said user to reconfigure the shape of said subsection; and
   providing a control accessible by said user wherein said control is operable by said user to independently reconfigure the shape of said subsection of said graphical user interface in a plurality of user desired configurations in response to operation of said control by said user without supplying an input to said application program controlled by said graphical user interface and without altering the function of said graphical user interface.

2. A method of formatting a graphical user interface, said method comprising:
   providing a graphical user interface;
   defining a subsection of said graphical user interface;
   designating said subsection of said graphical user interface as reconfigurable, so that a user can reconfigure said subsection without reconfiguring the entire graphical user interface; and
   providing a control accessible by said user wherein said control is operable by said user to independently reconfigure the shape of said subsection of said graphical user interface in a plurality of user desired configurations in response to operation of said control by said user without supplying an input to an application program controlled by said graphical user interface and without altering the function of said graphical user interface.

3. The method as described in claim 2 and further comprising:
   designating only said subsection of said graphical user interface as reconfigurable so that during use said user can reconfigure only said subsection without reconfiguring the remainder of said graphical user interface.

4. The method as described in claim 2 and further comprising:
defining a maximum expansion size limit for said subsection.

5. The method as described in claim 4 and further comprising:
utilizing a height of said subsection to define said maximum expansion size limit of said subsection.

6. The method as described in claim 4 and further comprising:
utilizing a width of said subsection to define said maximum expansion size limit of said subsection.

7. The method as described in claim 2 and further comprising:
defining a minimum compression size limit for said subsection.

8. The method as described in claim 7 and further comprising:
utilizing a height of said subsection to define said minimum compression size limit of said subsection.

9. The method as described in claim 7 and further comprising:
utilizing a width of said subsection to define said minimum compression size limit of said subsection.

10. The method as described in claim 2 and further comprising:
allowing said user to expand the entire graphical user interface;
expanding said subsection in a manner proportional to said expansion of said entire graphical user interface; and
discontinuing expansion of said subsection at a predetermined boundary for said subsection while continuing to expand said remainder of said graphical user interface.

11. The method as described in claim 2 and further comprising:
designating a plurality of subsections of said graphical user interface as reconfigurable, so that during use said user can reconfigure at least one of said plurality of subsections without reconfiguring the entire graphical user interface.

12. The method as described in claim 2 and further comprising:
allowing said user to relocate said subsection within the graphical user interface.

13. The method as described in claim 2 and further comprising:
allowing said user to define spatial rules for said subsection.

14. A method of formatting a graphical user interface, said method comprising:
providing a graphical user interface;
defining a subsection of said graphical user interface;
designating said subsection of said graphical user interface as non-reconfigurable, so that a user can reconfigure the remainder of said graphical user interface without reconfiguring said subsection of said graphical user interface; and
providing a control accessible by said user wherein said control is operable by said user to independently reconfigure the shape of said remainder of said graphical user interface in a plurality of user desired configurations in response to operation of said control by said user without supplying an input to an application program controlled by said graphical user interface and without altering the function of said graphical user interface.

15. The method as described in claim 14 and further comprising:
designating only said subsection of said graphical user interface as non-reconfigurable so that during use said user can reconfigure only the remainder of said graphical user interface without reconfiguring said subsection of said graphical user interface.

16. The method as described in claim 14 and further comprising:
designating a plurality of subsections of said graphical user interface as non-reconfigurable, so that during use said user can reconfigure the remainder of said graphical user interface without reconfiguring said plurality of subsections of said graphical user interface.

17. The method as described in claim 14 and further comprising:
allowing said user to reconfigure the remainder of said graphical user interface while retaining said subsection in a fixed location relative to a reference point.

18. The method as described in claim 14 and further comprising:
allowing said user to define spatial rules for the remainder of said graphical user interface.

19. A method of formatting a graphical user interface, said method comprising:
providing a graphical user interface;
designating a subsection of said graphical user interface;
defining spatial properties of said subsection;
providing a control accessible by a user wherein said control is operable by said user to independently reconfigure the shape of said subsection of said graphical user interface in a plurality of user desired configurations in response to operation of said control by said user; and
permitting a user to reconfigure said graphical user interface with said control while retaining said spatial properties of said subsection and without supplying an input to an application program controlled by said graphical user interface and without altering the function of said graphical user interface.

* * * * *